April 20, 1943.　　O. J. BROWN, JR., ET AL　　2,317,026
CARBON BLACK PRODUCT AND PROCESS OF MAKING THE SAME
Filed June 14, 1938
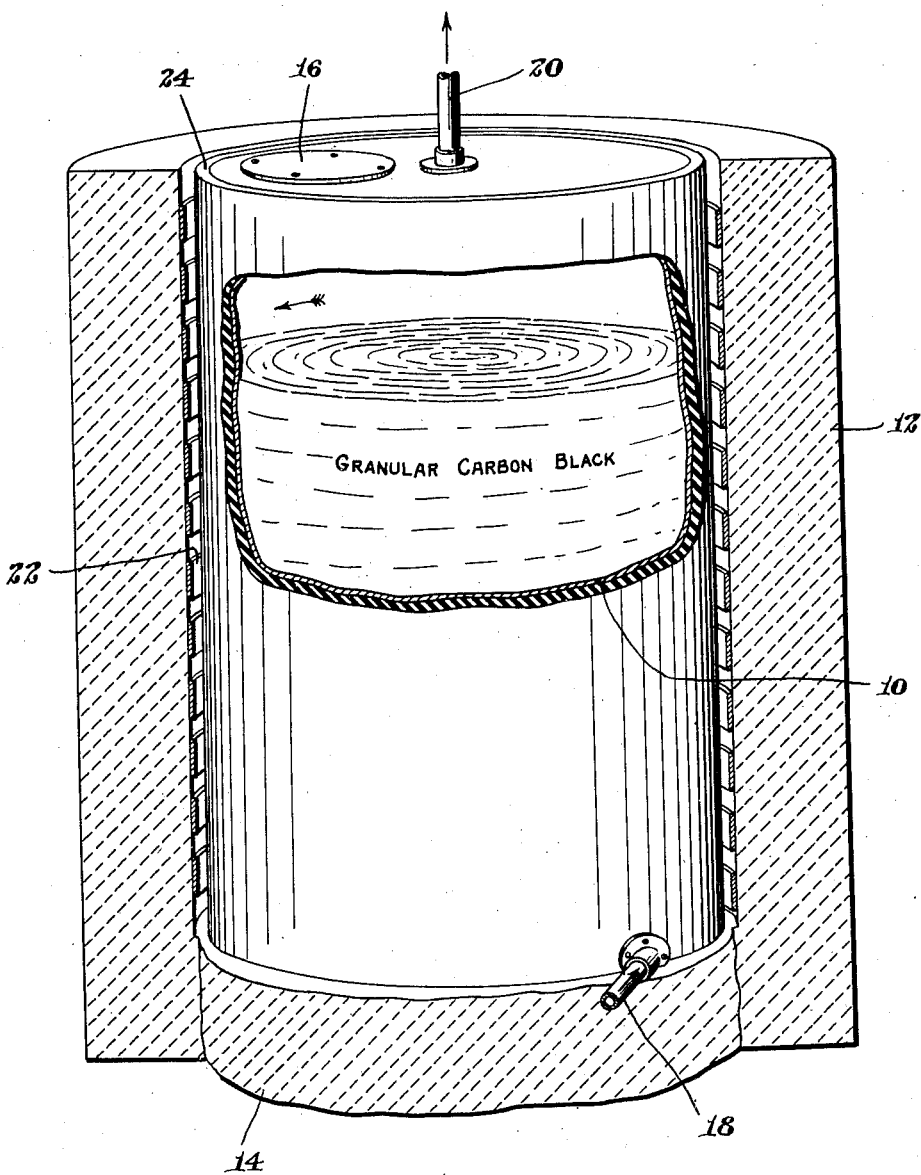
Inventors
Owen J. Brown Jr.
and Walter R. Smith
by Henway & Witter
Attorneys Patented Apr. 20, 1943

2,317,026

UNITED STATES PATENT OFFICE 2,317,026

CARBON BLACK PRODUCT AND PROCESS OF MAKING THE SAME

Owen J. Brown, Jr., Boston, and Walter R. Smith, Cambridge, Mass., assignors to Godfrey L. Cabot, Inc., Boston, Mass., a corporation of Massachusetts Application June 14, 1938, Serial No. 213,606

7 Claims. (Cl. 252—268)

This invention consists in a novel process of preparing activated or highly adsorptive carbon black and in the novel product of such process as herein disclosed. Activated carbon for industrial and military uses has heretofore been prepared from certain charcoals and from carbon bearing material such as anthracite or bituminous coal by processes of differential oxidation. Lamp black has to some extent been activated in the same manner after having been shaped or molded with a binder such as tar or pitch, calcined and ground, but, except as noted, no natural flocculent carbon products have been successfully utilized as the raw material for activated carbon.

Carbon black is produced in large quantities by burning natural gas against channel irons upon which it is deposited in very light flocculent form.

It is scraped from the channel irons, stirred, bolted and packed for shipment with an apparent density usually of 12 to 16 pounds per cubic foot. In this condition it is extremely viscous, adherent and dusty and has a low value as an adsorptive agent. Attempts have been made to activate the carbon black of commerce in its flocculent state but these have not been entirely satisfactory, and in any case the use of carbon black in flocculent form as an activated carbon is limited to certain fields because of its slow filter rate.

We have discovered that carbon black may be activated and an adsorptive agent of high capacity thus produced by first converting the ordinary flocculent carbon black into relatively dense, granular form, and then heat treating the granules by subjecting them to the action of a hot oxidizing gas. The resulting product is granular, free-flowing, non-adherent, and substantially dustless, having an apparent density of about 14 pounds per cubic foot and a satisfactory filter rate. Flocculent carbon black in a dry state may be converted to granular form by turbulent agitation as disclosed in U. S. Letters Patent No. 2,120,541, granted June 14, 1938, to Billings and Offutt, by wetting and stirring, or by various other commercial wet or dry processes. One such granular carbon black product constitutes the subject matter of U. S. Letters Patent 1,957,314, granted to Billings and Offutt May 1, 1934. The dry process of turbulent agitation is particularly advantageous in that it produces granules of carbon black which are substantially free of extraneous matter, particularly binders such as tar, pitch or the like.

Activated carbon black in this granular form is useful in certain decolorizing and deodorizing fields, such as in removing color from sugar syrups, removing fats, oils, and dye stuffs from chlorinated solutions, for bleaching glycerine, or for water purification. Other fields of use are in the construction of gas masks, in the recovery of natural gasoline, or in the composition of blasting compounds. One convenient way of determining the adsorptive capacity of activated carbon blacks is by comparing iodine values, that is to say, by rating the carbon blacks in terms of the amount of iodine removed by them from a standard iodine solution. The more iodine removed from the solution the higher is the index number of the carbon black tested.

By the process of our invention we are able to provide activated granular carbon black having an iodine value of approximately 90 as compared with an iodine value of 50 for activated charcoal and an iodine value of approximately 10 for untreated granular carbon black. Thus we produce an activated carbon black product having high adsorptive characteristics and a filter rate which is desirably rapid. The novel product itself may be conveniently filtered or otherwise removed from solutions or gas mixtures in which it has been employed. Further, as already intimated, carbon black in granular form, free of extraneous binding ingredients, may be activated more easily and completely than carbon black in flocculent form.

These and other features of the invention will be best understood and appreciated from the following typical example selected for purposes of illustration and explained in connection with the apparatus shown in the accompanying drawing in which:

The figure is a view in perspective, partly in section.

Starting with the flocculent carbon black of commerce having an apparent density of about 12–14 pounds per cubic foot, we first convert this material by turbulent agitation in the dry state, or by any suitable wet process, into a mass of relatively dense, coherent, dustless granules having an apparent density of about 22 pounds per cubic foot. The granules are generally spherical in shape and between 20 and 200 mesh in size, or possibly slightly smaller and as already noted they comprise homogeneous carbon black, free of extraneous binder material. They are discrete and sufficiently stable to withstand handling in bulk without substantial disintegration. In general the smallest granules are the most efficient in our process.

The precise manner of carrying out this conversion step is of secondary importance only, so long as it is effected without the use of extraneous binding material. It is, of course, important not to add pitch, tar or the like as binders for several reasons. In the first place they introduce impurities into a product which is itself to be used eventually as a purifying medium; then they increase the ash content of the product and so interfere with crystalizing of sugar when the product is used as a decolorizing medium for sugar syrup; and they also objectionably harden the granules and impair their friability.

The conversion step may be carried out by the dry process of turbulently agitating the flocculent carbon black in a dry state as fully disclosed in Patent No. 2,120,541 above identified. It may be equally well carried out by any wet process of gradually adding water to dry flocculent carbon black and at the same time stirring the otherwise dry mixture and thereby causing agglomeration of the particles directly from the treated mass into discrete granules. Another satisfactory procedure in some instances is the two-liquid wet process disclosed in U. S. Letters Patent No. 1,889,429 Wiegand and Venuto.

A preferred manner of carrying out the activating step is to subject binder-free granular carbon black, however prepared to the action of steam at a temperature of 1750° or thereabouts for an interval of 1 to 3 hours. In general the interval may be somewhat reduced by increasing the temperature of the steam within reasonable limitations and vice versa.

In the drawing is shown one form of simple apparatus suitable for carrying out this step of the process although it is merely suggestive and shown in no sense by way of limitation. The apparatus includes in its structure a vertically disposed cylindrical container 10 enclosed within an asbestos jacket 24, and resting upon an insulating base 14. Surrounding the jacket 24 is a continuous spiral of nichrome wire 22 serving as an electric heating unit when connected to a source of current. The container is provided in its upper head with a removable cover plate 16 enclosing an opening through which carbon black may be delivered to and removed from the container. Thick heat insulating walls 12 surround the jacket 24 and the wire 22. A steam supply pipe 18 leads into the container tangentially near its bottom head and a steam discharge pipe 20 leads out of its upper head.

In carrying out the heat treating or activating step of our novel process the container 10 is filled about three-quarters full with the granular carbon black already described and heated to about 1750° F., whereupon steam is admitted continuously to the container through the medium of the pipe 18. The result is that the heated mass of granular carbon black is swept by the steam into a whirling mass within the container and continues in such turbulent motion while the steam continues to flow. The treatment may be continued from 1 to 3 hours, the steam meanwhile passing out of the container through the pipe 20. At the conclusion of this step the steam flow is cut off, the cover plate 16 removed, and the now activated carbon black removed from the container.

The finished product preserves its spherical form and granular size as well as its dustless and free flowing characteristics but is somewhat reduced in its density. For example, the granular carbon black at the beginning of the heat treating step may have an apparent density of about 22 pounds and the activated product may have an apparent density of 12 to 14 pounds per cubic foot.

Instead of steam we may employ any oxidizing gas which is effective to remove from the granular carbon black all traces of hydrocarbons and occluded or adsorbed gases. For example, we may use carbon dioxide, chlorine or any mixture of these gases or we may heat the granular carbon black under suitably controlled atmospheric conditions. The activating step of the process is accompanied by some unavoidable loss of carbon black by oxidation, which may be reduced to a minimum by controlling the temperature at which the process is carried out.

The resulting activated carbon black exhibits an increase in iodine value of 600% as compared to the unactivated granules, and an increase of 80% as compared to commercially activated carbons heretofore known. It contains practically no ash as compared with 10 to 50% ash found in commercial activated carbons, and none of the chlorides, sulphates, sulphides or other impurities that go to make up such ash. The product is dustless and free flowing and can thus be handled conveniently in automatic machinery and in a cleanly manner. It has a high filter rate, being superior in this characteristic to activated carbons heretofore known and the granules are of large enough size so that the product does not clog the pores of filter press cloth. It also has a higher iodine value than commercially activated charcoal products.

When used as a decolorizing medium in a sugar refinery binder-free activated pellets of carbon black have effected 58.8% color removal, against 9% color removal effected by granular but unactivated carbon black; that is, the product of our invention is 6½ times as effective by this test as untreated "Spheron." In the same test a commercial activated carbon (not carbon black) effected 28% color removal.

An example of another use of activated granular carbon black is found in the field of explosives. Very efficient inexpensive blasting charges may be manufactured by saturating activated granular carbon black with liquid air or liquid oxygen. The resultant explosive can be packed in cartridges which are considerably smaller than those used in prior practice.

The advantages and characteristics of our novel product above discussed are not by any means all inclusive, but indicate in a general way the broad field of industry in which our invention may be usefully applied.

Having now described our invention, what we claim as new and desire to secure by Letters Patent of the United States is:

1. The process of making highly adsorptive carbon black having a fast filter rate, which includes the steps of converting the dry flocculent carbon black of commerce into dense free-flowing granules containing no extraneous binder, and then subjecting the granules to the action of an oxidizing gas stream at a temperature above 1700° F. while maintaining the free-flowing characteristics of the granules.

2. The process of making carbon black which is highly adsorptive, free of extraneous material and has a fast filter rate, characterized by the steps of converting flocculent carbon black into substantially spherical granules which are sufficiently tenacious to withstand handling in bulk without disintegration, and then activating the carbon black granules by treating them with steam for at least thirty minutes.

3. The process of making highly adsorptive, homogeneous carbon black having a fast filter rate which includes the steps of converting flocculent carbon black into granules having an apparent density in bulk of at least 20 pounds per cubic foot, and then subjecting said granules to the action of steam while maintaining them in a state of turbulence and thereby activating the product and reducing its apparent density below 20 pounds per cubic foot.

4. Adsorptive carbon black in the form of self-sustaining, free-flowing granules free from binding or other extraneous materials, having an apparent density of 12 to 14 pounds per cubic foot and an iodine value above 50 as compared to an iodine value of about 10 for the untreated carbon black.

5. Adsorptive carbon black in the form of substantially dustless, ash-free granules below 20 mesh in size and having a high decolorizing capacity as compared to untreated granular carbon black.

6. The process of making activated carbon black, which includes the step of converting flocculent carbon black into the form of relatively dense, free-flowing, substantially dustless granules free from binding materials, then subjecting the granules to the action of a hot oxidizing gas while preserving their identity and free-flowing characteristics, whereby there is produced a highly absorptive granular carbon black, free of extraneous material and having an iodine value substantially greater than five times that of the untreated granular carbon black.

7. Absorptive carbon black in the form of free-flowing granules formed from flocculent black, free from binding or other extraneous materials, said carbon black having an apparent density of substantially twelve to fourteen pounds per cubic foot, and an iodine value substantially greater than five times that of the untreated granular carbon black.

OWEN J. BROWN, Jr.
WALTER R. SMITH.